United States Patent
Kim et al.

(10) Patent No.: US 9,626,152 B2
(45) Date of Patent: *Apr. 18, 2017

(54) METHODS AND SYSTEMS FOR RECOMMENDING RESPONSIVE STICKER

(71) Applicant: NCsoft Corporation, Seoul (KR)

(72) Inventors: Taek Jin Kim, Seongnam (KR); Jay June Lee, Seoul (KR); Jungsun Jang, Seoul (KR); Sehee Chung, Yongin (KR); Kyeong Jong Lee, Yongin (KR); Yeonsoo Lee, Seoul (KR)

(73) Assignee: NCSOFT CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,558

(22) Filed: Jul. 14, 2015

(65) Prior Publication Data

US 2016/0210116 A1    Jul. 21, 2016

(30) Foreign Application Priority Data

Jan. 19, 2015   (KR) .................. 10-2015-0008726

(51) Int. Cl.
  *G06F 17/27*   (2006.01)
  *G06F 3/16*    (2006.01)

(52) U.S. Cl.
  CPC ............ *G06F 3/167* (2013.01); *G06F 17/276* (2013.01)

(58) Field of Classification Search
  CPC ......... G06F 3/167; G10L 15/22; G10L 15/26; G10L 15/1822; G10L 2015/223; G10L 2015/088
  See application file for complete search history.

(56) References Cited

U.S. PATENT DOCUMENTS

| | | | |
|---|---|---|---|
| 6,910,186 B2 * | 6/2005 | Kim .................. | G06Q 30/02 715/706 |
| 7,912,720 B1 * | 3/2011 | Hakkani-Tur ........ | G06F 17/274 704/1 |

(Continued)

OTHER PUBLICATIONS

Sacks, H., Schegloff, E. A., and Jefferson, G. (1974). A Simplest Systematics for the Organization of Turn-Taking for Conversation. Language, 4, 696-735.*

(Continued)

*Primary Examiner* — Fariba Sirjani
(74) *Attorney, Agent, or Firm* — Patent Office of Dr. Chung Park

(57) ABSTRACT

Provided are a method and a computer program of recommending a responsive sticker. The method includes: generating dialog situation information by analyzing pairs of the last utterance of a second user and previous utterances and previous utterances of a first user as an utterance of the second user terminal is inputted into the server; determining a similar situation from a dialog situation information database that is already collected and constructed, using the generated dialog situation information; determining whether it is a turn for the first user terminal to input a response; selecting a responsive sticker candidate group from the determined similar situation when it is a turn for the first user terminal to input the response; and providing information on at least one responsive sticker of the responsive sticker candidate group for the first user terminal.

20 Claims, 15 Drawing Sheets

(56) References Cited

U.S. PATENT DOCUMENTS

| | | | | |
|---|---|---|---|---|
| 8,340,971 | B1* | 12/2012 | Abella | H04M 3/493 |
| | | | | 704/1 |
| 8,458,278 | B2* | 6/2013 | Christie | G06Q 10/107 |
| | | | | 709/207 |
| 8,473,420 | B2* | 6/2013 | Bohus | G06Q 10/10 |
| | | | | 340/541 |
| 8,843,372 | B1* | 9/2014 | Isenberg | G10L 17/26 |
| | | | | 704/250 |
| 9,269,357 | B2* | 2/2016 | Itoh | G06F 17/30746 |
| 9,329,677 | B2* | 5/2016 | Chien | G06F 3/011 |
| 2002/0133355 | A1* | 9/2002 | Ross | G10L 15/1822 |
| | | | | 704/275 |
| 2003/0061029 | A1* | 3/2003 | Shaket | G06F 17/279 |
| | | | | 704/9 |
| 2005/0144013 | A1* | 6/2005 | Fujimoto | G10L 15/22 |
| | | | | 704/277 |
| 2008/0096533 | A1* | 4/2008 | Manfredi | G06N 3/006 |
| | | | | 455/412.1 |
| 2008/0301557 | A1* | 12/2008 | Kotlyar | G06Q 10/10 |
| | | | | 715/706 |
| 2009/0144366 | A1* | 6/2009 | Lyle | G06Q 10/107 |
| | | | | 709/204 |
| 2011/0131042 | A1* | 6/2011 | Nagatomo | G10L 15/18 |
| | | | | 704/240 |
| 2011/0294525 | A1* | 12/2011 | Jonsson | G06F 17/27 |
| | | | | 455/466 |
| 2013/0080169 | A1* | 3/2013 | Harada | G10L 25/63 |
| | | | | 704/249 |
| 2013/0174058 | A1* | 7/2013 | Kaul | G06F 3/0481 |
| | | | | 715/753 |
| 2014/0052794 | A1* | 2/2014 | Tucker | G06Q 50/01 |
| | | | | 709/206 |
| 2014/0067375 | A1* | 3/2014 | Wooters | G06F 17/28 |
| | | | | 704/9 |
| 2014/0181229 | A1* | 6/2014 | Tucker | H04L 12/1827 |
| | | | | 709/206 |
| 2014/0298364 | A1* | 10/2014 | Stepanov | H04N 21/25 |
| | | | | 725/10 |
| 2014/0365887 | A1* | 12/2014 | Cameron | G06F 17/30058 |
| | | | | 715/716 |
| 2015/0178388 | A1* | 6/2015 | Winnemoeller | G06F 17/30864 |
| | | | | 707/722 |
| 2015/0193889 | A1* | 7/2015 | Garg | G06Q 30/0251 |
| | | | | 705/14.49 |
| 2015/0254447 | A1* | 9/2015 | Leuthardt | G06F 21/32 |
| | | | | 705/14.67 |
| 2015/0256675 | A1* | 9/2015 | Sri | H04M 3/5183 |
| | | | | 379/265.09 |
| 2015/0281157 | A1* | 10/2015 | Pearce | H04L 51/18 |
| | | | | 709/206 |
| 2016/0063992 | A1* | 3/2016 | Selfridge | G10L 15/22 |
| | | | | 704/254 |
| 2016/0127280 | A1* | 5/2016 | Nair | H04L 51/04 |
| | | | | 709/206 |

OTHER PUBLICATIONS

Yeon-Su Lee, et al. "A method for measuring Inter-Utterance Similarity Considering Various Linguistic Features," Korean Sound Conference, vol. 28, Book 1, pp. 61-69 (2009).

Gumwon Hong et al., "A Korean Mobile Conversational Agent System," Korea Computer Science Conference, vol. 13, Book 6, 2008.

* cited by examiner

METHODS AND SYSTEMS FOR RECOMMENDING RESPONSIVE STICKER

CROSS-REFERENCE TO RELATED APPLICATIONS

This U.S. non-provisional patent application claims priority under 35 U.S.C. §119 of Korean Patent Application No. 10-2015-0008726, filed on Jan. 19, 2015, the entire contents of which are hereby incorporated by reference.

BACKGROUND OF THE INVENTION

The present invention disclosed herein relates to a method of recommending stickers during a dialogue through a social network service or an instant messenger, and more particularly, to a method of recommending a responsive sticker to respond to an utterance of the other party.

Emoticons are being used to express the emotional state of a user during a dialogue through a social network service or an instant messenger.

In the past, emoticons (e.g., OTL, TT, ^^; etc.) written with texts was added to the end of the utterance, but in recent years, emoticons of graphic image types are being widely used.

While inputting dialogue contents, a user opens an emoticon selection window and then selects and inputs an appropriate emoticon. In order to more conveniently perform the foregoing process, a technology of automatically converting and expressing a text inputted by a user into an emoticon has been also developed.

FIG. 1 is a view illustrating an emoticon displayed on a well-known personal computer messenger (NateOn).

In the well-known messenger shown in FIG. 1, when a specific keyword is inputted, the corresponding text is automatically converted into an emoticon corresponding to the specific keyword. In FIG. 1, when a user inputs a word "present", it can be seen that the word "present" is automatically converted into the emotion corresponding to the present.

However, when a specific keyword is simply inputted, this related art technology merely expresses an emoticon matched with the specific keyword in advance. Accordingly, in many cases, emoticons are expressed in regardless of dialogue contents or contexts and emotional state, even in an inappropriate manner in the light of the dialogue situation.

In order to overcome these limitations, Korean Patent Application Publication No. 10-2011-0026218 discloses "apparatus and method for inputting text message and its program stored in recording medium", which extract words indicating the emotional state from dialogue contents that are inputted, and select an emoticon matching with the emotional state using the extracted words.

However, this technology is also merely to match the keyword with the corresponding emoticon one-to-one by analyzing inputted texts when keywords representing the emotional state such as happiness and sadness show.

Accordingly, since the context or dialogue situation and relationship between users are not considered, inappropriate emoticons may be recommended.

In addition, the paper published in Korean Computer Conference, by Jun-Hyuk Kim et al., 2014, entitled "Automated Emotion Recommendation Module Based on Bigram-Signature Using Text Mining" discloses a technology of more accurately extracting keywords for recommending emoticons by parsing Korean sentences using bigram.

However, the technology disclosed in the paper also provides only one-to-one matching of a keyword and an emoticon, and has a limitation in that an appropriate emoticon cannot be recommended in consideration of the situation or context of dialogue.

Particularly, the foregoing technology is merely to analyze utterances of users-dialogue contents-themselves and recommend emoticons corresponding thereto, and has a limitation in that emoticons for appropriately responding to utterances of the other party cannot be recommended.

PRIOR ART DOCUMENT

Patent Document

Document 1. Korean Patent Application Publication No. 10-2011-0026218 entitled "Apparatus and method for inputting text message and its program stored in recording medium"
Document 2. Korean Patent No. 10-0751396 entitled "System and method for auto conversion emoticon of SMS in mobile terminal"

Non-Patent Document

Document 3. Jun-Hyuk Kim, Young-Woong Park, Seul-Bi Ha, and Yong-Seok Choi, "Automated Emotion Recommendation Module Based on Bigram-Signature Using Text Mining", Korean Computer Conference, PP 1632-1634, 2014.
Document 4. Yeon-Su Lee, Joong-Hui Shin, Gum-Won Hong, Young-In Song, Do-Gil Lee, and Hae-Chang Rim, "A Method for Measuring Inter-Utterance Similarity Considering Various Linguistic Features", Korean Sound Conference, Vol. 28, Book 1, PP 61-69 (2009).
Document 5. GumWon Hong, Yeon-Soo Lee, Min-Jeong Kim, Seung-Wook Lee, Joo-Young Lee, and Hae-Chang Rim, "A Korean Mobile Conversational Agent System", Korea Computer Science Conference, Vol. 13, Book 6, 2008.

SUMMARY OF THE INVENTION

The present invention provides a method of recommending a sticker so as to allow long-distance users to use the sticker in a messenger or a social network service in which long-distance users exchange dialogues with each other, and more specifically, a technology of selecting and recommending an appropriate sticker by understanding dialogue situation and emotion state by the unit of dialogue, not by the unit of utterance.

The present invention also provides a method of recommending an appropriate sticker in consideration of a dialogue situation, a context, and a relationship with a user, instead of mechanically recommending an identical sticker, even when identical keywords or dialogue contents are inputted.

The present invention also provides a method of enabling a user to simply select a recommended sticker and respond to the last utterance of the other party by recommending a sticker that can be seen as a contextually appropriate response to the last utterance of the other party during a dialogue.

Embodiments of the present invention provide methods of recommending a responsive sticker, include: by a server connected to a first user terminal and a second user terminal through a network, generating dialogue situation information by analyzing pairs of the last utterance of a second user—in this case, the last utterance of the second user including a text type of dialogue contents—and previous utterances and previous utterances of a first user as an utterance of the second user terminal is inputted into the server; determining a similar situation from a dialogue situation information database that is already collected and constructed, using the generated dialogue situation information; determining whether it is a turn for the first user terminal to input a response; selecting a responsive sticker candidate group from the determined similar situation when it is a turn for the first user terminal to input the response; and providing information on at least one responsive sticker of the responsive sticker candidate group for the first user terminal.

In some embodiments, the last utterance of the second user may include only a sticker instead of a text type of dialogue contents. The generating of the dialogue situation information may include generating dialogue situation information from metadata of a sticker comprised in the last utterance of the second user.

In other embodiments, the metadata of the sticker may have values corresponding to at least one of keywords, dialogue act information and emotion information, and the generating of the dialogue situation information may include generating dialogue situation information by substituting the values of the metadata of the sticker with the dialogue act information, the emotion information and the keywords, respectively.

In still other embodiments, the dialogue situation information may include dialogue act information, emotion information, keywords of a certain number of previous utterances of the first user and the last utterance and a certain number of previous utterances of the second user.

In even other embodiments, the determining of the similar situation may include determining a dialogue in which the dialogue situation information generated from the dialogue situation information database is similar to the flow of dialogue act information or the flow of emotion information as a similar situation. In this case, situation may mean a dialogue including a plurality of continuous utterances.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
FIG. 1 is a view illustrating a typical automatic emoticon conversion technology.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, exemplary embodiments of the present invention will be described in detail with reference to the accompanying drawings. In order to clarify the present invention, a description irrelevant to the constitution of the present invention will be omitted, and in the drawings, like reference numerals refer to like elements throughout.

Since the terms "including", "comprising", and "having" can be construed as encompassing corresponding components unless specially described as opposite, it should be understood that they do not exclude other components but encompass other components. Unless defined otherwise, all technical and scientific terms have the same meanings as commonly understood by those skilled in the art to which the present invention belongs.

In the detailed description of the invention and claims, components named as "~unit", "~part", "~module", and "~block" mean units that process at least one function or operation, and each of which can be implemented by software, hardware, or a combination thereof.

Hereinafter, a sticker denotes a graphic image attached to dialogue contents for use during a dialogue on a messenger or social network service. The sticker can be used interchangeably with an emoticon.

Hereinafter, an attached sticker denotes a sticker that accompanies a dialogue sentence inputted by a user and is attached to the inputted sentence.

Hereinafter, a responsive sticker denotes a sticker used to respond to a sticker used by the other party in the last dialogue or the last dialogue contents inputted by the other party.

The attached sticker may be a sticker recommended for a dialogue sentence inputted by the other party, and the responsive sticker may be a sticker recommended for a user (not the other party) in order to respond to a sticker used by the other party or the last dialogue sentence inputted by the other party.

Hereinafter, the attachment of a sticker denotes expressing the graphic image of the corresponding sticker at the front or rear of a dialog box or inputted dialogue contents or in the middle of the dialog box or inputted dialogue contents.

Hereinafter, an utterance denotes a basic unit of dialogue inputted by a user on a messenger or a social network service. Generally, the utterance may be performed by inputting dialogue contents in a form of text into a dialogue input window and then pushing a button "Send".

Hereinafter, a dialogue situation denotes a state flow of dialogue which emerges through the intention of utterance, emotion, and keyword analysis.

Hereinafter, a speech act denotes the intention of utterance.

Hereinafter, dialogue situation information, which is information obtained through dialogue act analysis, emotion analysis, and surface analysis on utterances, includes dialogue act information (information on dialogue act category), emotion information (information on emotion category and emotion strength), and keywords. The dialogue situation information may be generated from a single utterance, but preferably, may include dialogue act flow and emotion flow in regard to two or more continuous utterances.

Hereinafter, a dialogue situation information database denotes a database that stores a large amount of dialogue situation information through machine learning to dialogue act attachment corpuses and emotion attachment corpuses. The dialogue situation information database may include dialogue situation information on continuous utterances and pairs of utterance-sticker for each utterance.

The dialogue situation database may include a plurality of dialogues, dialogue act information and emotion information of which are analyzed. Each dialogue may include a series of utterances, and hereinafter, "situation" during similar situation retrieval may be interpreted as a synonym for "dialogue".

Figure 2:
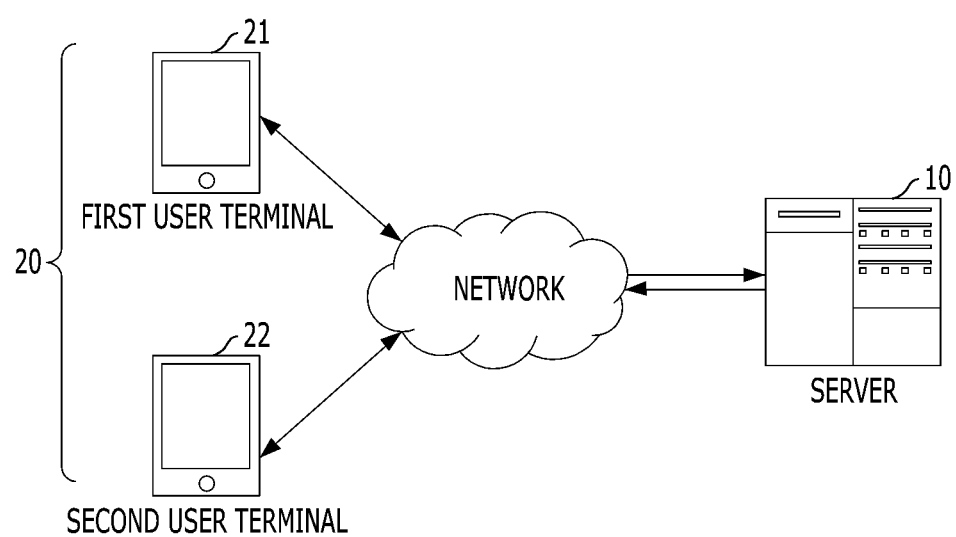
FIG. 2 is a view illustrating a relationship of a server and user terminals.

FIG. 2 is a view illustrating a relationship of a user terminal 20 and a server 10.

The user terminal 20 may be connected to the server 10 through a network, and may correspond to a unit for inputting dialogue contents or expressing an utterance inputted from the other party.

A user may exchange a visual form of messages including texts and images with other users via the server 10 using the user terminal 20.

Examples of the user terminal 20 may include smart phones and personal computers as the unit for performing the foregoing functions. In addition, units that can be connected to the network (e.g., Internet) and enable a visual type of communication for a user should be construed as being included in the user terminal 20.

Hereinafter, a first user may be in dialogue with the other party by exchanging messages with the other party, and a first user terminal 21 may correspond to a unit that enables the first user to perform the visual type of communication.

A second user may be the other part in dialogue with the first user, and a user terminal 22 may be a terminal used by the second user for dialogue.

The server 10 may relay messages between the first user and the second user, and furthermore, may recommend a responsive sticker to the first user such that the first user can conveniently respond to an utterance of the second user.

Hereinafter, it will be described that the server 10 recommends stickers to the first user, but this distinguishment between the first user and the second user is merely for better understanding as a matter of convenience. Accordingly, it is natural that the server 10 can recommend stickers to both users.

In FIG. 2, although only a single server is shown, a server group including a plurality of servers divided in accordance with functions thereof may be provided.

For example, the server 10 may also include a messenger server for relaying a dialogue between the first user terminal 21 and the second user terminal 22, a sticker recommendation server for analyzing a dialogue and recommending stickers, and a server for providing a social network service.

Also, the server 10 may be connected to an external social network service server in order to provide a sticker recommendation result for the user terminal 20 via the external server.

The responsive sticker recommendation method according to the embodiment of the present invention may be executed in the server 10 connected to the first user terminal 21 and the second user terminal 22 as described above.

Figure 3:
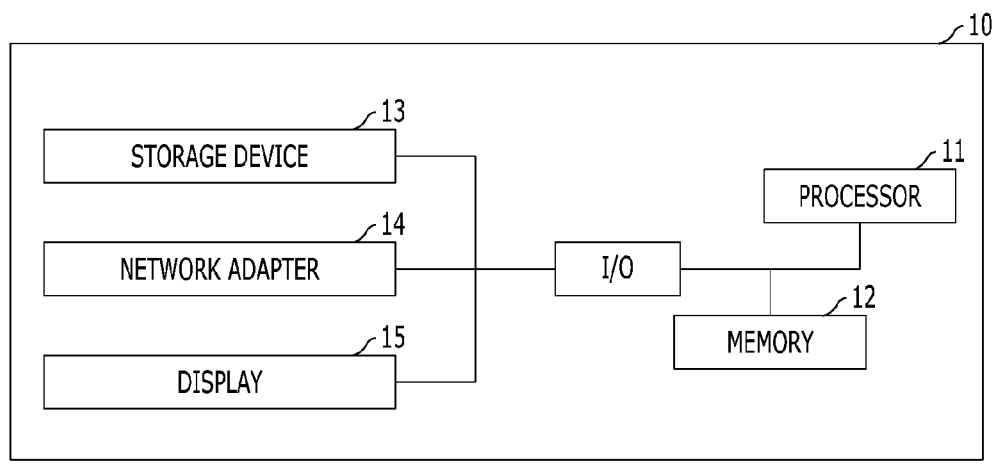
FIG. 3 is a view illustrating the configuration of a server.

FIG. 3 illustrates the hardware structure of the server.

As shown in FIG. 3, the server 10 may include a processor 11, a memory 12, a storage unit 13, and a network adapter 14.

The storage unit 13 may be loaded with already-analyzed dialogue situation information database and computer programs recorded with commands for executing the responsive sticker recommendation method of the present invention.

The memory 12 may correspond to a storage space for storing commands of the computer program, and the processor 11 may execute the commands loaded on the memory to execute the responsive sticker recommendation method of the present invention.

The network adapter 14 may communicate with the first user terminal 21 and the second user terminal 22 through wired/wireless communication methods.

The server 10 may select and recommend appropriate stickers during the dialogue of users through the following process.

First, the server 10 may collect dialogue contents from the first user terminal 21 and the second user terminal 20, and may analyze the dialogue situation by segmenting and analyzing an utterance.

Meanwhile, the server 10 may select an appropriate sticker candidate group by retrieving similar situations from the dialogue situation database using the established dialogue situation classification system and dialogue situation information, and may determine the ranking of stickers based on the situation and preference and finally recommend stickers to a user.

That is, unlike a related art in which one-to-one matching (recommending identical sticker in regard to identical keyword) is performed through simple comparison of keywords, even though identical keyword is checked from the parsing of dialogue contents, different stickers may be recommended in accordance with the dialogue situation, relation with the other party, or personal preference of a user.

Figure 4:
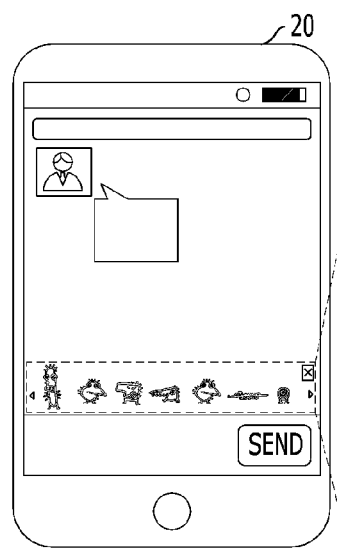
FIG. 4 is a view illustrating examples of recommending stickers in consideration of relation with the other dialogue party, dialogue emotion, dialogue situation, and personal preference.

FIG. 4 is a view illustrating examples of recommending, by the server 10, different sticker groups in accordance with the relation with the other party, dialogue emotion, dialogue situation, and personal preference in spite of identical dialogue contents.

In Example #1 of FIG. 4, when the other dialogue party is a superior or a close friend, it can be seen that different sticker groups are recommended.

In case of a superior, stickers giving an excessively unceremonious feeling may be excluded, and stickers appropriate for dialogue with a superior may be mainly recommended.

On the other hand, when the other party is a close friend, stickers that can be used conveniently instead of sticking to formality may be mainly recommended.

In Example #2 of FIG. 4, an appropriate sticker group may be recommended in accordance with the emotional state of a user.

When a user talks about hard and sad company works, the server 10 may catch the emotional state of a user, and may recommend a sticker group matching with the emotional state as shown in Example #2 of FIG. 3.

In Example #3 of FIG. 4, an appropriate sticker group may be recommended in accordance with the dialogue situation.

When the other dialogue party says to give a treat at the last inputted dialogue contents, stickers appropriate for the talk of the other dialogue party may be recommended as the dialogue contents of a user.

In Example #4 of FIG. 4, the ranking of selected sticker groups may be again determined and then recommended in accordance with the personal preference.

From the analysis of metadata of stickers that are much used at ordinary times by a user, if a user mainly use stickers expressed as overaction, then the server 10 may correct and provide a sticker group for the first user terminal 21 such that stickers expressed as overaction can be preferentially exposed among the sticker group selected in consideration of the dialogue situation, the relation with the other party, and the emotional state.

Figure 5:
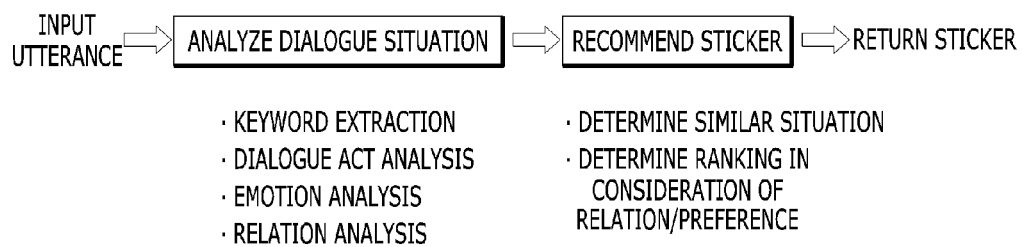
FIG. 5 is a view illustrating a process of recommending stickers by analyzing collected utterances.

As shown in FIG. 5, these series of sticker recommendation processes may be roughly divided into a dialogue situation analysis process and a sticker recommendation process.

FIG. 5 is a view illustrating a process of recommending stickers by analyzing collected utterances.

In the dialogue situation analysis process, through natural language processing, colloquial style of sentences may be corrected, and morphemes may be analyzed. Also, parts of speech may be attached. The correction of colloquial style of sentences, the analysis of morphemes, and the attachment of parts of speech may refer to well-known researches.

The dialogue act analysis and the emotion analysis may be performed using classified words and corpuses.

Also, the relationship between dialogue parties may be analyzed through the analysis on pairs of dialogues that are exchanged.

"Dialogue act", i.e., intention of utterance may be classified into various types from the general-purpose or social formality viewpoint of dialogue. For example, the intention may be classified into "praise", "help request", "greeting", and "boast".

"Emotion" may be divided into various categories according to the degree of emotion. For example, the emotion may be classified into categories such as "happiness" and "sadness", and may be divided in accordance with the degree of emotion such as "very", "normally", and "slightly".

"Relation" may be classified in accordance with the relationship between subordinates and superiors and the degree of intimacy. For example, the relation may be classified into "superior", "subordinate", "familiarity", and "unfamiliarity".

When the dialogue situation is analyzed through the foregoing process, the server 10 may retrieve the most similar dialogue situation from the dialogue situation information database in the sticker recommendation process.

The similar situation may be mainly determined based on the dialogue act flow (mainly defining context), and the emotion information or the user relationship may be overall considered.

Hereinafter, these series of processes will be described in detail with reference to the accompanying drawings.

First, in the dialogue situation analysis process, the server 10 may not analyze only a single utterance, but also may analyze the flow of two-way dialogue between dialogue parties.

The dialogue situation analysis process may be further divided into an utterance unit analysis process and a dialogue unit analysis process.

In the utterance analysis process, the analysis of vocabulary level may be performed regardless of the context.

In the utterance analysis process, colloquial style of sentences may be first corrected. In the correction of the colloquial style of sentences, word spacing, misspelling and slang may be corrected. Emoticons may be recognized to be converted into vocabularies corresponding thereto.

Meanwhile, morpheme analysis and attachment of parts of speech may be performed, and thus keywords may be extracted.

Thereafter, in the dialogue unit analysis process, dialogue act analysis, emotion analysis, and relation analysis may be performed. Thus, the server 10 may generate dialogue situation information.

In the dialogue unit analysis process, the analysis may be performed in consideration of the two-way dialogue context, not the utterance unit, and the situation classification system that is already constructed during the dialogue unit analysis may be used.

Figure 6A:
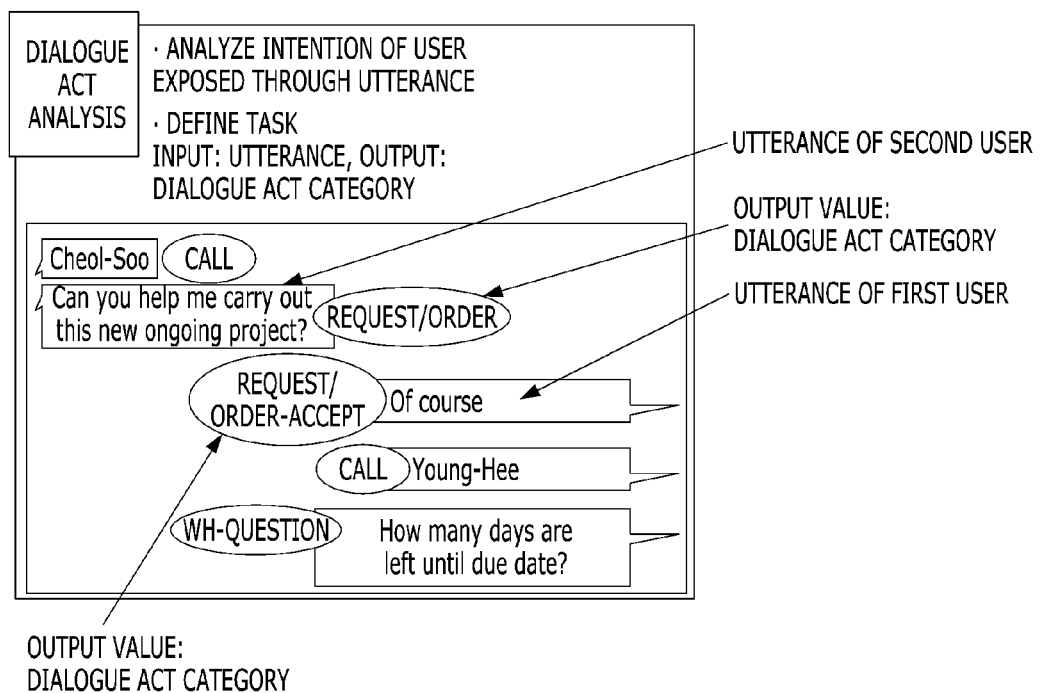
FIG. 6A to 6C are views illustrating dialogue act analysis, emotion analysis, and relation analysis, respectively.
Figure 6B:
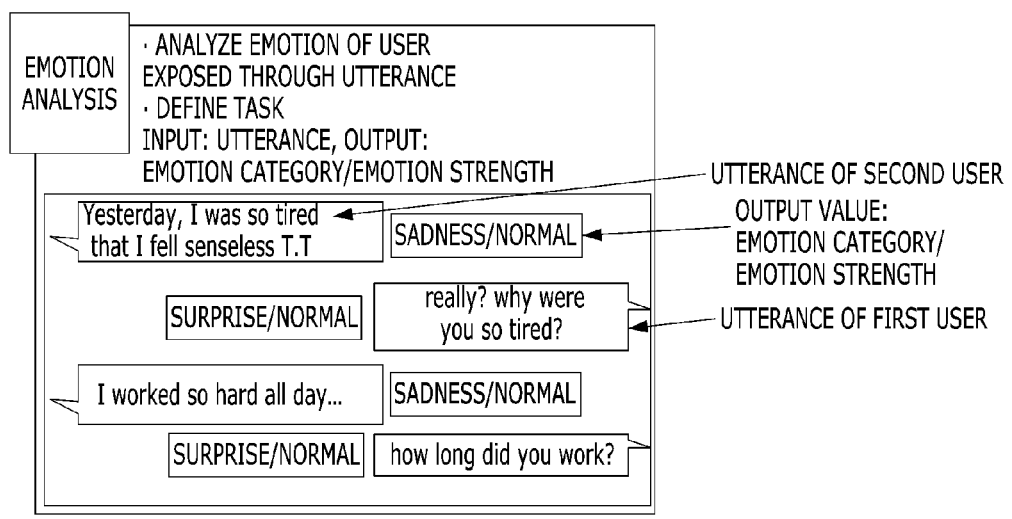
Figure 6C:
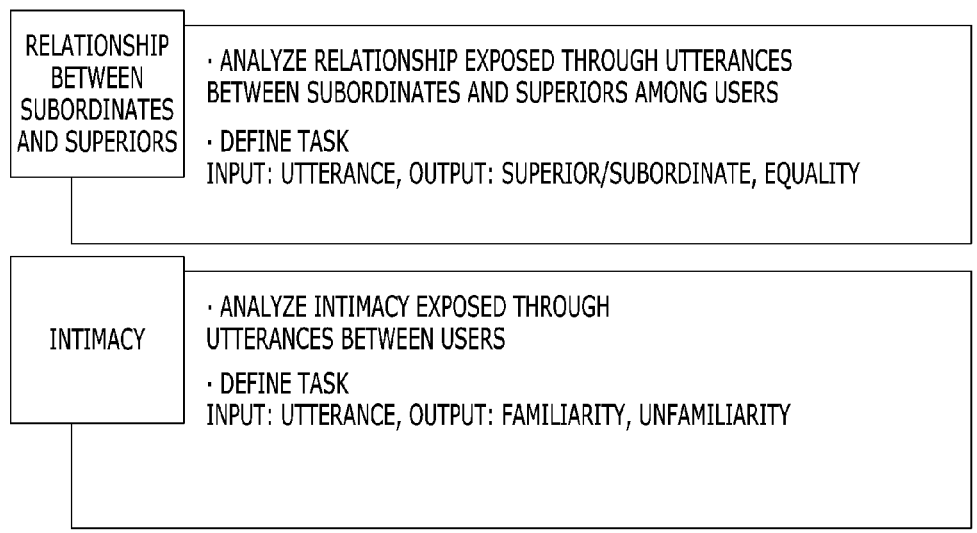

FIG. 6A to 6C are views illustrating dialogue act analysis, emotion analysis, and relation analysis, respectively.

As shown in FIG. 6A, the intention of a user, exposed through utterances, may be analyzed in the dialogue act analysis process.

The input value may be "utterance", and the output value may be "dialogue act category".

In FIG. 6A, when the first user inputs an utterance "Can you help me carry out this new ongoing project?", it can be seen that the output value corresponding thereto is "request/order" that is one of predefined dialogue act categories.

As shown in FIG. 6B, the emotion of a user, exposed through utterances, may be analyzed in the emotion analysis process.

The input value may be "utterance", and the output value may be "emotion category and emotion degree".

In FIG. 6B, when the first user inputs an utterance "Yesterday, I was so tired that I fell senseless. TT", it can be seen that the output value corresponding thereto is "sadness" and "normal". That is, the emotion category may be analyzed as "sadness", and the emotion degree may be analyzed as "normal".

As shown in FIG. 6C, the relationship between subordinates and superiors and the intimacy between users, which are exposed through utterances, may be analyzed in the relation analysis process.

The input value may be "utterance", and the output value of the analysis result on the relationship between subordinates and superiors may be "subordinates and superiors" or "equality". The output value of the analysis result on the intimacy may be "familiarity" or "unfamiliarity".

The dialogue situation classification system may be used for the dialogue act analysis or the emotion analysis.

The dialogue situation classification system may be divided into a dialogue act classification system and an emotion classification system.

The dialogue act classification system may be obtained by classifying the dialogue act, i.e., intention of dialogue into various types from the general-purpose or social formality viewpoint of dialogue.

Figure 7:
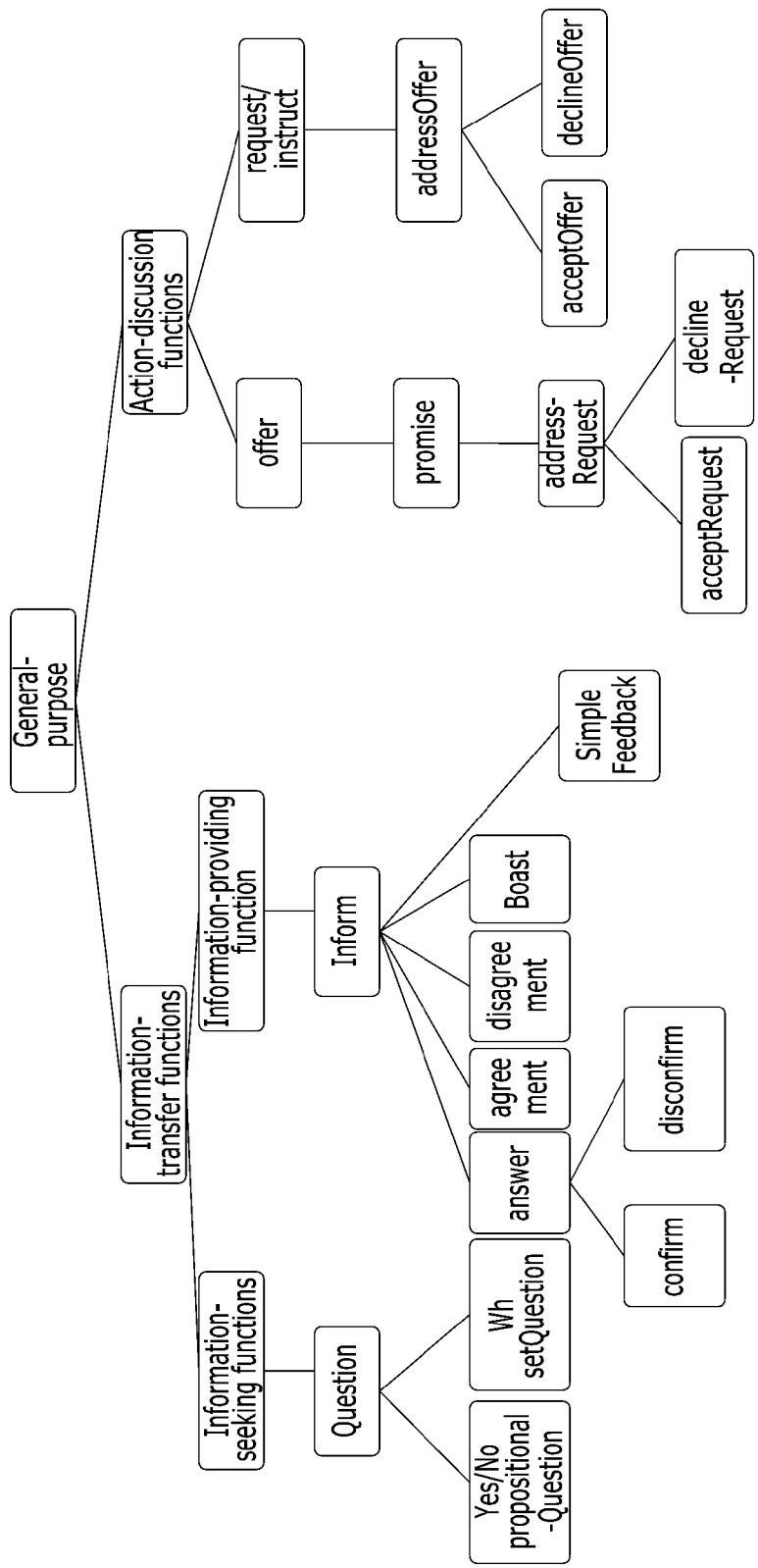
FIG. 7 is a view illustrating a classification system of dialogue acts from the general-purpose viewpoint of dialogue.

FIG. 7 is a view illustrating a classification system of dialogue acts from the general-purpose viewpoint of dialogue.

As shown in FIG. 7, the types such as "Yes-No question", "Wh-question", "Answer-confirm", "Answer-disconfirm", "Agreement", "Disagreement", and "Boast" may be shown.

In FIG. 7, the dialogue act classification system may reflect the hierarchical structure and the classification standards of ISO standard classification system, and may be established so as to comply with Korean language dialogue intention classification. The classification corresponding to emotion may be removed from the dialogue act classification system.

Figure 8:
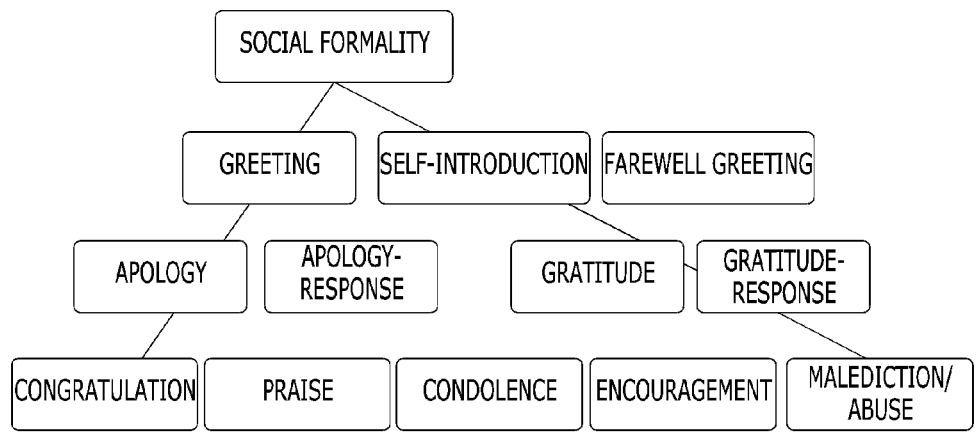
FIG. 8 is a view illustrating a classification system of dialogue acts from the viewpoint of social formality.

The dialogue act classification system of FIG. 8 may be a separate classification system obtained by considering factors of the dialogue attitudes frequently emerging in a messenger service, in addition to the dialogue general-purpose classification system of FIG. 7.

In FIG. 8, the factors of the dialogue attitudes may include "greeting", "apology", "gratitude", "congratulation", "condolence", "encouragement", and "malediction".

The dialogue act classification system of FIG. 7 may correspond to a classification system of modalities of dialogue.

Figure 9:
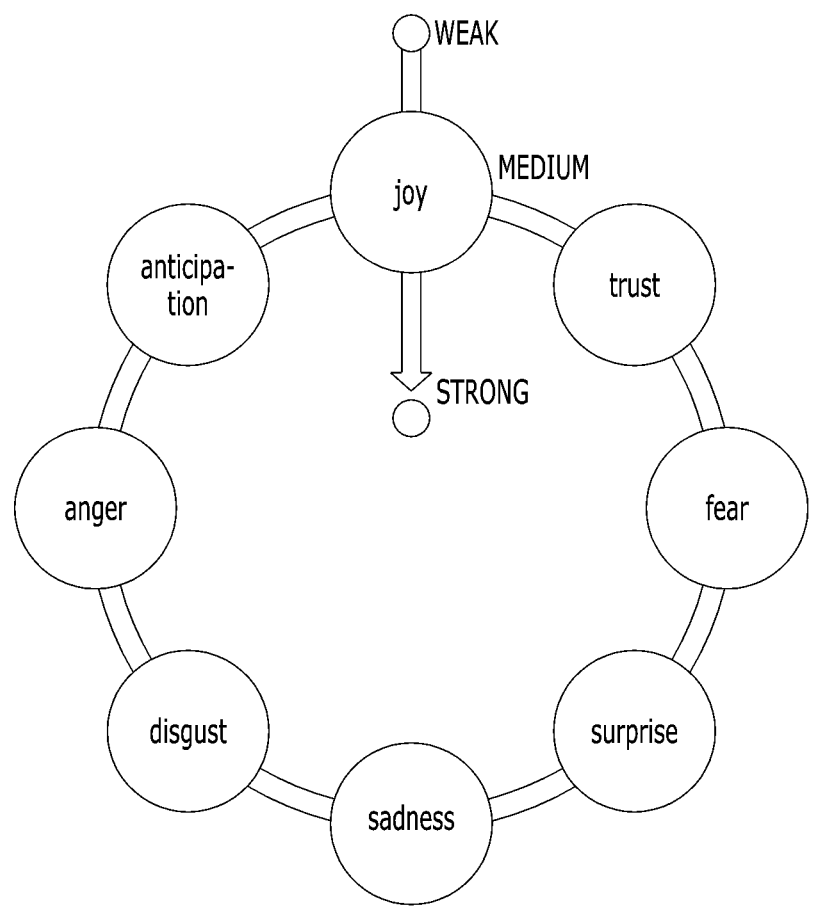
FIG. 9 is a view illustrating a classification system of emotion according to type and degree.

FIG. 9 is a view illustrating a classification system of emotion according to type and degree.

The emotion classification system of FIG. 9 may be obtained by referring to well-known emotion classification models, and may be divided into nine emotion categories including "neutral emotion", i.e., emotionless state.

Here, each emotion category may be divided into strong, medium, and weak in accordance with the emotion strength.

Next, in the sticker recommendation process, the server 10 may retrieve similar situations from the dialogue situation information database using the dialogue situation information of the analyzed utterance.

As shown in FIG. 5, the sticker recommendation process may include a similar situation retrieval process and a relationship and preference-based ranking determination process.

In the similar situation retrieval process, the most similar situation may be selected from dialogues of the dialogue situation information database that is already constructed, based on the most probable dialogue act flow using the dialogue situation information.

Also, it may be determined whether an utterance starts a theme or corresponds to a response.

Each situation may be beforehand matched with sticker candidate groups according to whether an utterance starts a theme or corresponds to a response. In the preference-based ranking determination process, the ranking of the matched sticker candidate groups may be determined.

Appropriate stickers may be preferentially exposed according to the suitability based on the situation and the relationship with the other party.

The sticker recommendation as illustrated in FIG. 4 may be achieved through these series of processes.

According to the responsive sticker recommendation method of the present invention, a method of recommending stickers to respond to the last dialogue contents inputted by the other party or recommending stickers used to respond to a sticker used in the last dialogue by the other party will be described with the above-mentioned method.

Example 1

Hereinafter, a method of recommending stickers according to an embodiment of the present invention will be described in detail with reference to FIGS. 10 and 11.

Figure 10:
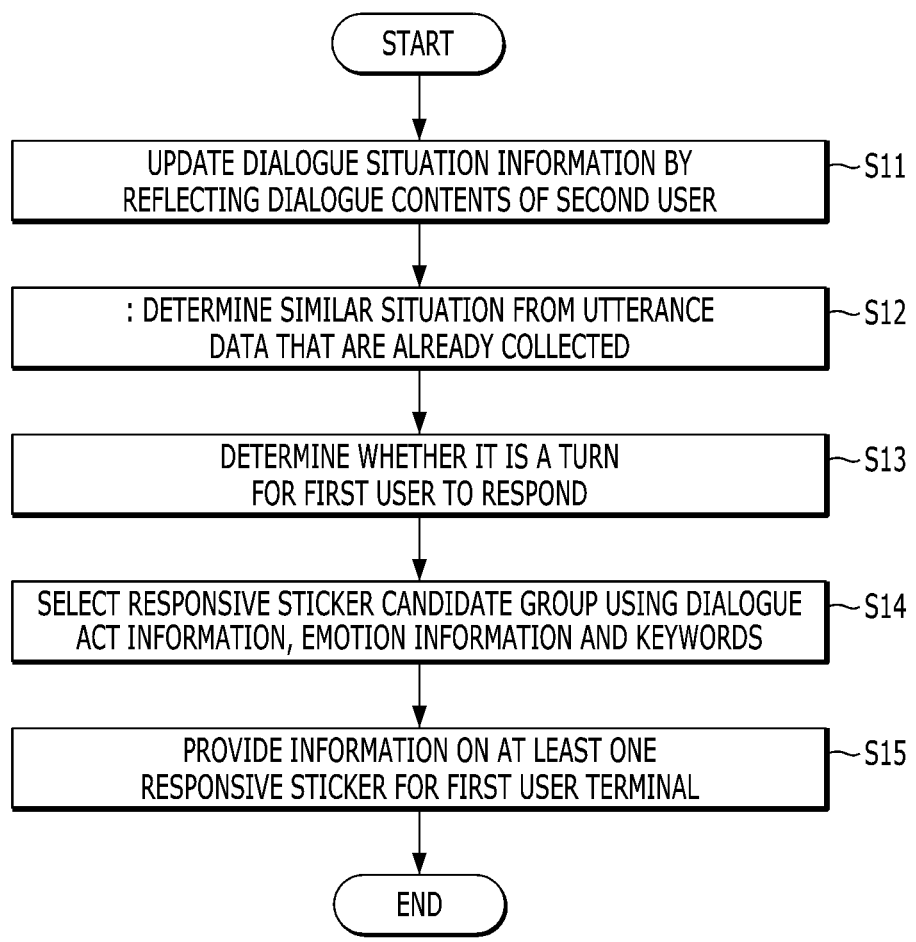
FIG. 10 is a flowchart illustrating a method of recommending a responsive sticker according to an embodiment of the present invention.
Figure 11:
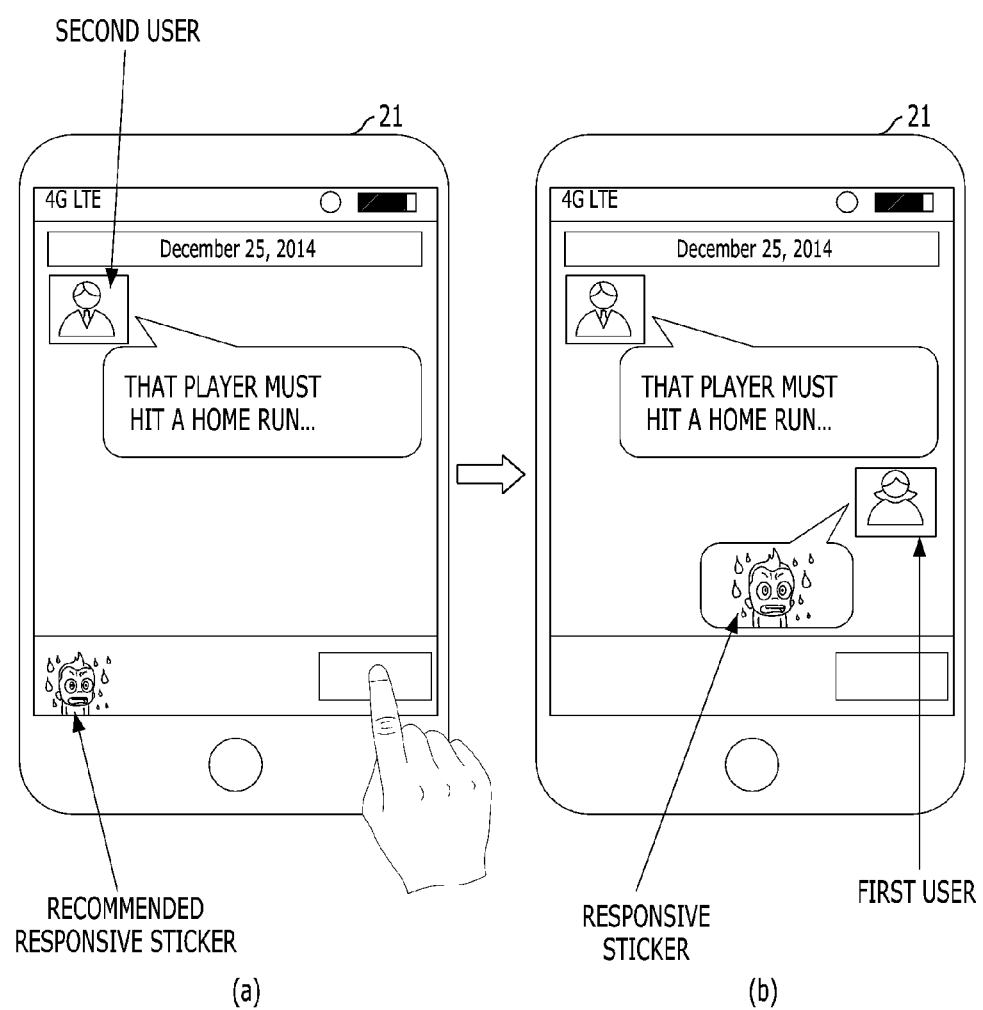
FIG. 11 is a view illustrating a responsive sticker displayed on a user terminal according to an embodiment of the present invention.

FIG. 10 is a flowchart illustrating a method of recommending a responsive sticker according to an embodiment of the present invention, and FIG. 11 is a view illustrating a responsive sticker displayed on a user terminal according to an embodiment of the present invention.

As illustrated in FIG. 11, an embodiment of the present invention relates to a method of recommending a sticker that is appropriate for use by a first user during a dialogue in response to the last utterance of a second user.

As illustrated in FIG. 11, when the second user inputs a dialogue "That player must hit a home run . . . ", a sticker may be automatically recommended in response to the corresponding utterance, and thus the first user can respond to the corresponding utterance by simply selecting a recommended sticker.

As shown in FIG. 10, the server 10 may collect and analyze utterances between the first user terminal 21 and the second user terminal 22 to generate the dialogue situation information.

Meanwhile, as receiving utterances from the second user terminal 21, the server 10 may update dialogue situation information by analyzing the last utterance (i.e., the last inputted utterance of the second user terminal 21) of the second user and the previous utterances, and pairs of previous utterances of the first user (S11).

In this case, the last utterance of the second user may be limited as including dialogue contents of text form. The case where the last utterance of the second user includes only a sticker will be described later as a separate embodiment.

The dialogue situation information may be generated using the last several pairs of utterances (pairs of dialogues exchanged by users), and may be updated in accordance with the progress of dialogue. This may be to reflect the continuous changes of the emotional state or the dialogue modality of users.

Meanwhile, as the dialogue situation information is generated and updated, the server 10 may retrieve similar situations from dialogues of the dialogue situation information database that is already constructed.

The dialogue situation information database may be accumulated through machine learning utilizing enormous corpus, and each dialogue may include a series of continuous utterances. Each utterance may include dialogue act information, emotion information, and keyword information.

Thus, the retrieval of the similar situation may be to retrieve a dialogue having the most similar dialogue act/emotion flow from the dialogue situation information database that is already collected and analyzed.

Thereafter, the server 10 may determine whether or not the next utterance is a turn of the first user terminal 21 to respond in the light of the dialogue determined from the similar situation (S13).

The following methods may be used for determining whether or not it is the first user terminal's turn to respond.

For example, in the dialogue that is determined as the similar situation, when the utterance corresponding to the last utterance of the second user terminal 22 is an utterance that starts a theme, it may be determined that it is a turn of the first user terminal 21 to input a response.

That is, in the dialogue that is determined as the similar situation, if the utterance corresponding to the last utterance of the second user terminal 22 is analyzed as an utterance that starts a theme, then the utterance (corresponding to the response of the first user) of the other party may be considered as a response.

In the dialogue that is determined as the similar situation, if there is an utterance corresponding to "response" immediately after the utterance corresponding to the last utterance of the second user terminal 22, it may be still more determined that it is a turn of the first user terminal 21 to input a response.

Also, it may be determined in accordance with the dialogue act information of the last utterance of the second user terminal 22 whether it is a turn for the first user terminal 21 to input a response. For example, when the dialogue act category of the last utterance is a "Wh-question", it may be predicted that the next utterance of the first user will be an "answer".

If it is not a turn for the first user terminal to input a response, then the situation is finished.

That is, when it is not a turn for the first user terminal to input a response, as shown in the related art of FIG. 1, the situation may correspond to a case where dialogue contents themselves inputted by the first user needs to be analyzed to recommend a sticker matching with inputted contents, and thus may not be dealt in the present invention.

If it is a turn for the first user terminal to input a response, then the next utterance of the other party may be acquired from the dialogue corresponding to the determined similar situation.

An utterance corresponding to the last utterance of the second user terminal 22 "That player must hit a home run . . . " may be found from the dialogue corresponding to the similar situation, and then an utterance corresponding to "response" may be acquired from the next utterances of the dialogue.

Then, a responsive sticker candidate group appropriate for the utterance may be selected (S14).

The dialogue situation information database may store pairs of utterances-stickers, and a sticker attached to the acquired utterance may also be immediately recommended to the first user.

Also, a responsive sticker candidate group appropriate for the acquired utterance corresponding to "response" may be selected by a certain algorithm, and one or more among the responsive sticker candidate group may be provided for the first user terminal 21.

When the responsive sticker candidate group is selected in operation S14, the algorithm for selecting the responsive sticker candidate group may be variously implemented.

The important point is retrieving a dialogue corresponding to similar situation from the dialogue situation information database, and then retrieving an utterance corresponding to the last utterance of the second user terminal 22 from the retrieved dialogue, and then considering an utterance corresponding to a "response" among the next utterances of the dialogue as a response of the first user, and selecting a responsive sticker candidate corresponding thereto.

Thus, when the sticker candidate group is selected, as shown in FIG. 4, information on at least one responsive sticker of the responsive sticker candidate group may be provided for the first user terminal 21 (S15).

As shown in FIG. 11, when the last utterance of the second user terminal 22, "That player must hit a home run . . . ", is transmitted and displayed on the screen of the first user terminal 21, and then the first user selects a dialogue input window in order to response to the last utterance of the second user by inputting dialogue contents, the server 10 may process the recommended sticker such that the sticker can be displayed on the screen of the first user terminal 21.

When the first user selects the dialogue input window for dialogue input, the first user terminal 21 may inform the server 10 that the dialogue input window has been selected, and as illustrated in FIG. 4, the server 10 may process the recommended sticker so as to be displayed at one side of the dialogue input window.

That is, even though stickers to be recommended are all selected, the server 10 may wait for the first user to start responding to the last utterance of the second user terminal 21, and then process the recommended sticker so as to be displayed on the screen of the first user terminal 21.

As illustrated in FIG. 11, a user may simply respond to the utterance of the other party by selecting one of recommended stickers instead of inputting dialogue contents into the dialogue input window.

Alternatively, the server 10 may process the recommended stickers and the send button so as to be displayed on the screen of the first user terminal 21 immediately after the last utterance of the second user terminal 22 is transmitted to the first user terminal 21.

At the same time when the utterance of the user terminal 22 is transmitted to the first user terminal 21, the server 10 may analyze the dialogue situation including the last utterance of the second user terminal 22 in order to recommend stickers, and may immediately display the recommended stickers on the screen of the first user terminal 21.

Since the send button is together displayed, the first user may be allowed to confirm the utterance of the second and immediately push the send button to transmit an appropriate sticker displayed on the screen.

That is, the response can be performed only by simply pushing the send button without inconveniently opening a virtual keyboard to input texts or select a sticker and then pushing the send button.

In this case, as described above, the ranking of the sticker candidate group may be determined in accordance with the relationship or the intimacy between the first user and the second user and the preference of the first user acquired by long-time analyzing the utterances of the first user through machine learning.

Also, the top-ranked sticker, i.e., a sticker predicted to be most appropriate according to the compensation result based on the relationship and the preference may be preferentially recommended.

When many stickers are recommended as shown in FIG. 4, the stickers may be arranged such that the top-ranked sticker is displayed at the front or leftmost side of the screen.

Also, as shown in FIG. 11, only one or two highest ranking stickers may be recommended.

Example 2

Hereinafter, a method of recommending stickers according to another embodiment of the present invention will be described in detail with reference to FIGS. 12 and 13.

Figure 12:
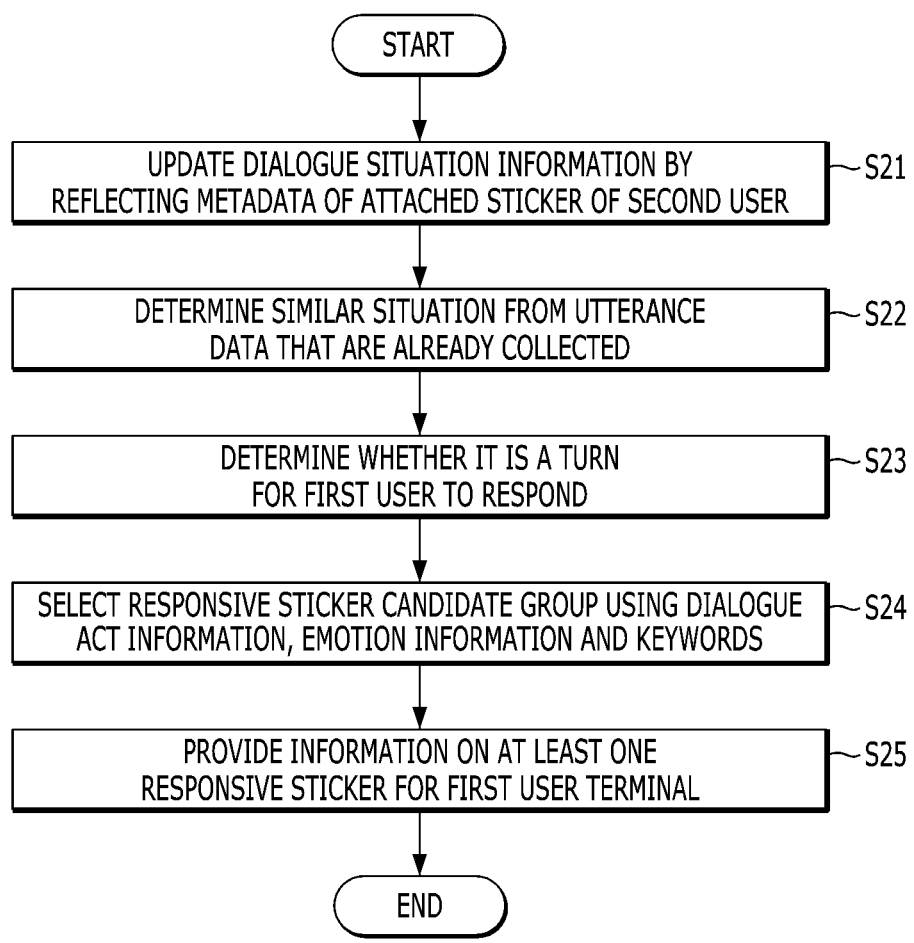
FIG. 12 is a flowchart illustrating a method of recommending a responsive sticker according to another embodiment of the present invention.
Figure 13:
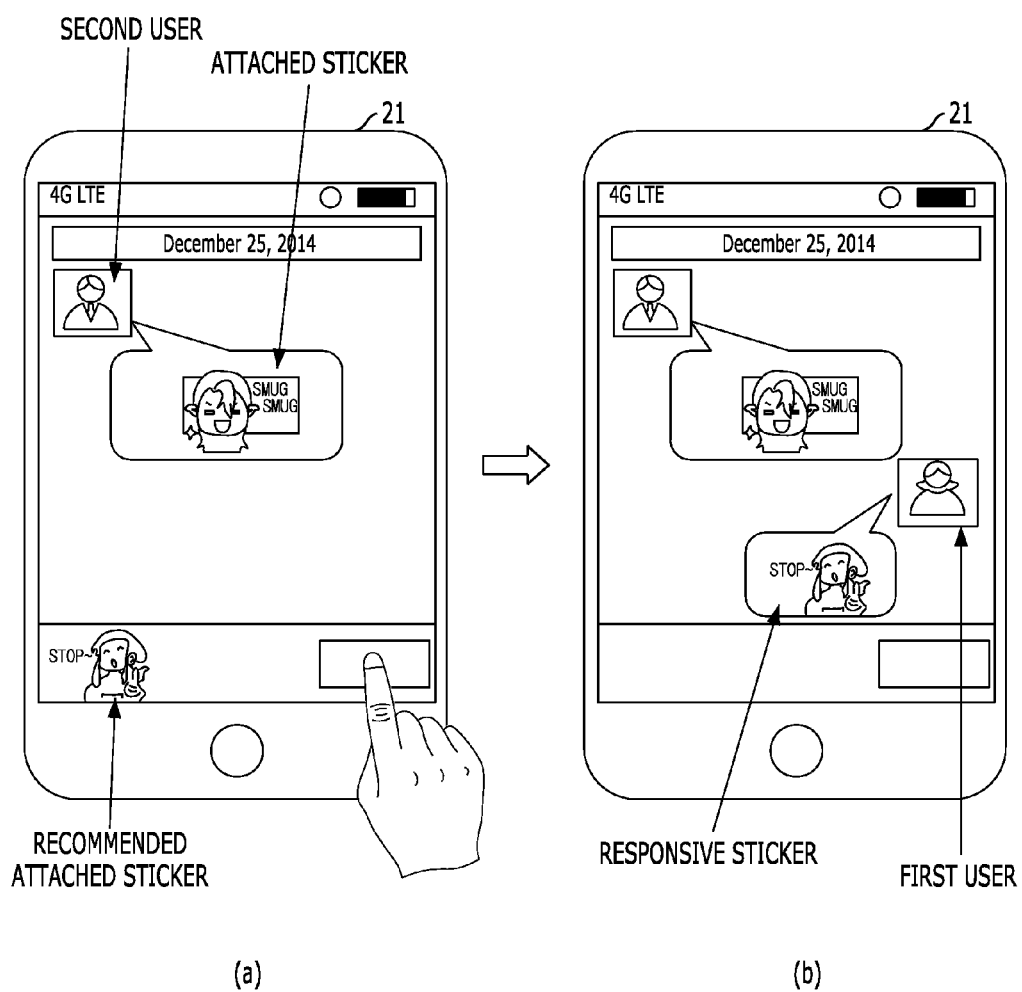
FIG. 13 is a view illustrating a responsive sticker displayed on a user terminal according to another embodiment of the present invention.

FIG. 12 is a flowchart illustrating a method of recommending a responsive sticker according to another embodiment of the present invention, and FIG. 13 is a view illustrating a responsive sticker displayed on a user terminal according to another embodiment of the present invention.

As illustrated in FIG. 13, another embodiment of the present invention relates to a method of recommending a sticker for responding to a sticker that a second user uses in the last utterance.

That is, when the utterance of the second user includes only a sticker, a sticker may be recommended so as to respond to the corresponding utterance only with the sticker without a separate dialogue input.

In another embodiment of the present invention, a first user may simply respond to a sticker inputted by the second user by simply selecting a recommended sticker.

As shown in FIG. 12, as a server 10 receives the last utterance of the second user, which includes only a sticker without a text type of dialogue contents, the server 10 may generate dialogue situation information (S21).

In this case, as described above, a dialogue situation analysis including dialogue act, emotion and relation analyses may be performed including the previous utterances of the first user and the second user.

A difference from Example 1 is that the last utterance of the second user includes only a sticker, not an utterance including a text type of dialogue contents.

That is, the analysis process like extraction of keywords through a natural language analysis may be impossible.

Thus, the server 10 may generate the dialogue situation information by considering the sticker included in the last utterance of the second user as a keyword of the corresponding utterance.

The last utterance of the second user shown in FIG. 13 may be a sticker that represents a conceited gesture, and may have a combination of metadata including "boast", "joy", and "I am so smart".

"Boast" may correspond to a dialogue act category, and "joy" may correspond to an emotion category. Also, "I am so smart" may correspond to a keyword. That is, as the metadata is designed as above, the sticker may be substituted with unit utterance on which a natural language analysis is completed.

In other words, dialogue act information, emotion information, and keywords may be acquired by analyzing the unit utterance, and the metadata of the sticker may have factors corresponding to dialogue act information, emotion information, and keywords, respectively.

Accordingly, subsequent processes may proceed similarly to Example 1.

That is, similar situations may be determined from a dialogue act classification system that is already constructed using the dialogue situation information (S22), and it may be determined whether or not it is a turn for the first user terminal to input a response (S23).

When it is a turn for the first user terminal 21 to input a response, an utterance corresponding to the response may be acquired from the determined similar situations, and a sticker candidate group to be recommended may be selected based on the utterance (S24). Information on at least one responsive sticker among the sticker candidate group may be provided for the first user terminal 21 (S25).

In FIG. 13, it can be seen that a responsive sticker of a figure saying "Stop" is recommended through the foregoing processes.

The method according to the embodiment of the present invention can also be embodied into a form of program instruction executable through various computer means, and can be recorded on computer readable media. The computer readable media may include program instructions, data files, data structures, or combinations thereof. The program instructions recorded in the media may be what is specially designed and constructed for the present invention, or may be what is well-known to computer software engineers skilled in the art. Examples of computer readable recording media include hard disk, magnetic media such as floppy disks and magnetic tapes, optical media such as CD-ROM and DVD, magneto-optical media such as floptical disk, and hardware devices such as ROM, RAM, and flash memory, which are specially configured so as to store and perform program instructions. Examples of program instructions may include high-level language codes which can be executed by computers using an interpreter and the like, as well as machine language codes which are made by a compiler.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

According to the embodiments, although an identical dialogue content or keyword is inputted, different stickers can be recommended in accordance with the dialogue situation and relationship with the other party. That is, compared to algorithms of automatically recommending a sticker through simple keyword matching, an appropriate sticker can be recommended in consideration of the dialogue situation or context.

Particularly, a user can respond to an utterance of the other party only with simply selection and input of a recommended sticker, by finding an appropriate response to the last utterance of the other party using the dialogue situation information and recommending a sticker corresponding thereto.

The present invention can be applied to social network service and messenger technical fields.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of recommending a responsive sticker by use of a server that is connected to a first user terminal and a second user terminal through a network and relays an utterance inputted to a messenger between the first user terminal and the second user terminal, the utterance including at least one of a text and an image, the method comprising:

generating dialogue situation information by analyzing a last utterance of a second user of the second user terminal and a previous utterance of the first user terminal, as the last utterance of the second user terminal is inputted into the server, the last utterance of the second user including a text type of dialogue contents, wherein the previous utterance of the first user is an utterance input to the first user terminal prior to input of the last utterance of the second user to the second user terminal;

determining a similar situation from a dialogue situation information database that is already collected and constructed, using the generated dialogue situation information;

selecting a responsive sticker candidate group from the determined similar situation;

analyzing a relation between the first user and the second user based on the last utterance of the second user and the previous utterance of the first user; and recommending at least one responsive sticker of the responsive sticker candidate group to the first user terminal, wherein the step of recommending comprises selecting the at least one responsive sticker, from among the responsive sticker candidate group, according to propriety of the at least one responsive sticker in view of a type of the relation between the first user and the second user.

2. The method of claim 1, wherein the dialogue situation information comprises dialogue act information, emotion information, keywords of a certain number of previous utterances of the first user and the last utterance and a certain number of previous utterances of the second user.

3. The method of claim 1, wherein the determining of the similar situation comprises determining a dialogue in which the dialogue situation information generated from the dialogue situation information database is similar to a flow of dialogue act information or a flow of emotion information as the similar situation.

4. The method of claim 3, wherein the determining of the similar situation comprises retrieving a dialogue in which the flow of dialogue act information or the flow of emotion information corresponding to pairs of dialogue act information or emotion information of the last utterance and the previous utterances of the second user and the previous utterances of the first user.

5. The method of claim 3, wherein in the dialogue that is determined as the similar situation, when an utterance corresponding to the last utterance of the second user terminal is an utterance that starts a theme, it is determined that it is a turn for the first user terminal to input a response.

6. The method of claim 3, wherein in the dialogue that is determined as the similar situation, when there exists an utterance corresponding to a response immediately after an utterance corresponding to the last utterance of the second user terminal, it is determined that it is a turn for the first user terminal to input a response.

7. The method of claim 3, wherein a dialogue act category of the last utterance of the second user terminal has a certain value, it is determined that it is a turn for the first user terminal to input a response.

8. The method of claim 1, wherein the step of recommending comprises displaying the recommended sticker on a screen of the first user terminal at the same time when a dialogue input window is selected by the first user.

9. The method of claim 1, wherein the step of recommending comprises displaying the recommended sticker and a send button on a screen of the first user terminal immediately after the last utterance of the second user terminal is sent to the first user terminal.

10. The method of claim 1, wherein the type of relation between the first user and the second user includes intimacy and relationship between superiors and subordinates.

11. A method of recommending a responsive sticker by use of a server that is connected to a first user terminal and a second user terminal through a network and relays an utterance inputted to a messenger between the first user terminal and the second user terminal, the utterance including at least one of a text and an image, the method comprising:

generating dialogue situation information by analyzing a last utterance of a second user of the second terminal and a previous utterance of a first user of the first terminal as the last utterance of the second user is inputted into the server, the last utterance of the second user including only a sticker, wherein the previous utterance of the first user is an utterance input to the first user terminal prior to input of the last utterance of the second user to the second user terminal;

determining a similar situation from dialogues of a dialogue situation information database that is already constructed, using the generated dialogue situation information;

selecting a responsive sticker candidate group matching with the determined similar situation;

analyzing a relation between the first user and the second user based on the last utterance of the second user and the previous utterance of the first user; and recommending at least one responsive sticker of the responsive sticker candidate group to the first user terminal, wherein the step of recommending comprises selecting the at least one responsive sticker, from among the responsive sticker candidate group, according to propriety of the at least one responsive sticker in view of a type of the relation between the first user and the second user.

12. The method of claim 11, wherein the generating of the dialogue situation information comprises generating dialogue situation information from metadata of a sticker comprised in the last utterance of the second user.

13. The method of claim 12, wherein the metadata of the sticker have values corresponding to at least one of keywords, dialogue act information and emotion information, and the generating of the dialogue situation information comprises generating dialogue situation information by substituting the values of the metadata of the sticker with the dialogue act information, the emotion information and the keywords, respectively.

14. The method of claim 11, wherein the step of recommending comprises displaying the recommended sticker on a screen of the first user terminal at the same time when a dialogue input window is selected by the first user.

15. The method of claim 11, wherein the step of recommending comprises displaying the recommended sticker and a send button on a screen of the first user terminal immediately after the last utterance of the second user terminal is sent to the first user terminal.

16. The method of claim 11, wherein the type of relation between the first user and the second user includes intimacy and relationship between superiors and subordinates.

17. A computer program recorded in a non-transitory recoding medium comprising commands for executing a method of recommending a responsive sticker on a computer by use of a server that is connected to a first user terminal and a second user terminal through a network and relays an utterance inputted to a messenger between the first user terminal and the second user terminal, the utterance including at least one of a text and an image, the method comprising:

generating dialogue situation information by analyzing a last utterance of a second user of the second user terminal and a previous utterance of a first user of the first user terminal, as the last utterance of the second user terminal is inputted into the server, the last utterance of the second user including a text type of dialogue contents, wherein the previous utterance of the first user is an utterance input to the first user terminal prior to input of the last utterance of the second user to the second user terminal;

determining a similar situation from a dialogue situation information database that is already collected and constructed, using the generated dialogue situation information;

selecting a responsive sticker candidate group from the determined similar situation;

analyzing a relation between the first user and the second user based on the last utterance of the second user and the previous utterance of the first user; and recommending at least one responsive sticker of the responsive sticker candidate group to the first user terminal, wherein the step of recommending comprises selecting the at least one responsive sticker, from among the responsive sticker candidate group, according to propriety of the at least one responsive sticker in view of a type of the relation between the first user and the second user.

18. The computer program of claim 17, wherein the type of relation between the first user and the second user includes intimacy and relationship between superiors and subordinates.

19. A computer program recorded in a non-transitory recoding medium comprising commands for executing a method of recommending a responsive sticker on a computer by use of a server that is connected to a first user terminal and a second user terminal through a network and relays an utterance inputted to a messenger between the first user terminal and the second user terminal, the utterance including at least one of a text and an image, the method comprising:

generating dialogue situation information by analyzing a last utterance of a second user of the second terminal and a previous utterance of a first user of the first terminal as the last utterance of the second user is inputted into the server, the last utterance of the second user including only a sticker, wherein the previous utterance of the first user is an utterance input to the first user terminal prior to input of the last utterance of the second user to the second user terminal;

determining a similar situation from dialogues of a dialogue situation information database that is already constructed, using the generated dialogue situation information;

selecting a responsive sticker candidate group matching with the determined similar situation;

analyzing a relation between the first user and the second user based on the last utterance of the second user and the previous utterance of the first user; and recommending at least one responsive sticker of the responsive sticker candidate group to the first user terminal, wherein the step of recommending comprises selecting the at least one responsive sticker, from among the responsive sticker candidate group, according to propriety of the at least one responsive sticker in view of a type of the relation between the first user and the second user.

20. The computer program of claim 19, wherein the type of relation between the first user and the second user includes intimacy and relationship between superiors and subordinates.

* * * * *